United States Patent [19]

Ritter

[11] 4,260,571

[45] Apr. 7, 1981

[54] METHOD FOR MOLDING EXPANDED PLASTIC MATERIAL ARTICLES

[75] Inventor: Albert E. Ritter, Durlinsdorf, France

[73] Assignee: Selene Trust, Vaduz, Liechtenstein

[21] Appl. No.: 895,452

[22] Filed: Apr. 11, 1978

Related U.S. Application Data

[63] Continuation-in-part of Ser. No. 671,949, Mar. 30, 1976, abandoned.

[30] Foreign Application Priority Data

May 21, 1975 [FR] France ................................ 75 15841
Jan. 16, 1976 [FR] France ................................ 76 01160

[51] Int. Cl.³ .......................... B29D 27/00; B29F 5/02
[52] U.S. Cl. ...................................... 264/53; 264/120; 264/126; 264/294; 264/310; 264/321
[58] Field of Search ................... 264/45.4, 53, 55, 321, 264/334, 51, 33, 120, 310, 294, 126; 425/4 R, 126 R, 345, 351, 397, 400, 418, 425, 321

[56] References Cited

U.S. PATENT DOCUMENTS

| 2,524,039 | 10/1950 | Carpentier | 264/55 |
|---|---|---|---|
| 2,774,991 | 12/1956 | McCurdy et al. | 264/53 |
| 3,058,162 | 10/1962 | Grabowski | 264/53 |
| 3,139,466 | 6/1964 | Couchman | 264/53 |
| 3,159,693 | 12/1964 | Plymale | 264/53 |
| 3,162,704 | 12/1964 | Attanasio et al. | 264/53 |
| 3,255,286 | 6/1966 | Luc-Belmont | 264/321 |
| 3,334,169 | 8/1967 | Erceg et al. | 264/321 |
| 3,458,608 | 7/1969 | Russell et al. | 264/55 |
| 3,676,033 | 7/1972 | Buonaiuto | 264/321 |
| 3,855,377 | 12/1974 | Uebewhart et al. | 264/53 |
| 3,923,948 | 12/1975 | Jackson et al. | 264/321 |
| 3,984,511 | 10/1976 | Lammers | 264/45.4 |
| 4,106,884 | 8/1978 | Jegelka | 264/51 |

FOREIGN PATENT DOCUMENTS

| 2011928 | 12/1971 | Fed. Rep. of Germany . |
|---|---|---|
| 954283 | 4/1964 | United Kingdom . |
| 970525 | 9/1964 | United Kingdom . |
| 1071561 | 6/1967 | United Kingdom . |
| 1319919 | 6/1973 | United Kingdom . |

Primary Examiner—W. E. Hoag
Attorney, Agent, or Firm—Cushman, Darby & Cushman

[57] ABSTRACT

According to the method of the invention an article of thermoplastic material is partially expanded and preformed in a heated mold. The preformed article is withdrawn from the heated mold to further expand at atmospheric pressure and is transferred still malleable into a cooled mold having the final size and configuration of the article.

12 Claims, 12 Drawing Figures

METHOD FOR MOLDING EXPANDED PLASTIC MATERIAL ARTICLES

RELATED APPLICATION AND CROSS REFERENCE

This application is a continuation-in-part of my co-pending application Ser. No. 671,949, filed Mar. 30, 1976 which was abandoned in favor of this application.

BACKGROUND OF THE INVENTION

1. Field of the Invention

The present invention relates to a molding method and apparatus for molding articles of expanded plastic material.

Molding methods for articles of expanded thermoplastic material have been known heretofore and especially methods for manufacturing articles obtained by agglomerating pre-expanded polystyrene beads.

Presently these methods are commonly used for manufacturing blocks, supports or shells for packaging food products, machinery or household electrical appliances etc... These products have excellent impact resistance, they are weather resistant and their cost is relatively low.

2. Description of the Prior Art

Usually, the known molding techniques include the following steps:

filling a molding cavity of a mold with pre-expanded polystyrene beads injecting steam for heating said beads to the softening temperature of the polymer and above the boiling point of the porogeneous fluid which is contained in said beads. Said steam causes the beads to expand and bring them to a partially molded state causing them to agglomerate into a homogeneous cellular mass.

cooling the product obtained in a cellular state contained in the mold in order to prevent a second expansion or a distorsion of the molded article; and, once the mold is cooled withdrawing the molded article from the mold, after which the mold can be heated again for the next molding cycle;

This method involves the use of a substantial heating system and means for rapidly cooling the mold in order that the two alternate steps, i.e. heating the mold and cooling thereof, do not increase excessively the manufacturing costs of the articles.

However, since the article is made from an excellent heat insulating material, this method results in a very limited production rate, and reduces drastically the efficiency and the profitability of the molding equipment.

Another disadvantage which affects this method is the consumption of energy. For example, when heating 0.150 kg of thermoplastic material, for producing a medium size article contained in the mold it is repeatedly necessary to heat, at each molding cycle, the 150 kg of the mold material itself. It can be realized that this mass ratio of about 1 to 1000, results in a considerable loss of energy which heavily affects the cost of the finished product.

In order to reduce the manufacturing cost it has been proposed to provide molds with multiple molding cavities. This approach is valid for small size articles only and on the other hand the design and the manufacturing of the molds which have to be machined accurately, from a good heat conducting material, such as aluminium, are very expensive.

Also the expenses for unavoidable servicing and maintenance of so complex equipment have to be taken into consideration. In order to carry out successive cooling operations, the mold is provided with internal passages which allow cooling water to circulate. If this water is not treated, calcar deposits thereof will block the injection nozzles and attack the walls of the mold or of its auxiliary equipment. Further, for economical reasons, the factories that are using the known method, use cooling systems which operate in close circuit and consequently include storage containers, tanks for water treatment, water cooling towers and pumping stations which considerably affect the production cost of the molded articles of expanded polystyrene produced in mass production.

In order to reduce the energy consumption due to the requirements, in the conventional molding methods, of alternatively heating and cooling a single mold, it has also been proposed to carry on the molding successively in two working stations. For instance, the method disclosed in the U.S. Pat. No. 3,676,033 (Buonaiuto) is achieved in a machine comprising a pre-molding station with a mold permanently heated and a finishing station with a mold permanently cooled. The hot mold is comprised by three main parts: a vertical frame which defines the vertical edges of the molded plate, a lower body which forms the bottom of the plate, and an upper body which forms the top of the plate. The cold mold is also comprised by three parts: a vertical frame identical to the corresponding frame of the hot mold, a lower body and an upper body which may slightly differ from the corresponding bodies of the hot mold in that they may comprise convex or concave molding cavities which are intended to be reproduced on the top or a bottom face of the molded plate. The machine further comprises a transfer mechanism for transferring the pre-molded plate from the pre-molding station to the finishing station.

In said method, the pre-molded article remains held within its lateral frame during the transfer operation and it is moved between two parallel platens which contact permanently its upper and lower faces, respectively, so as to prevent the pre-molded article from further expanding outside the hot mold.

With such a machine it is only possible to manufacture molded pieces which originally have the form of plane plates, even if said plane articles may be ulteriorly shaped to different configurations.

Further, with such a molding method, mechanical means (rigid frame and parallel platens) are provided for preventing the rough article pre-molded in the hot mold of the pre-molding station from further expanding during its transfer towards the cold mold at the finishing station.

Such an operating mold presents many drawbacks:

the fabrication is limited to simple geometrical shapes. It is thus impossible to manufacture cylindrical or frustro-conical articles such as thin walled tumblers or cups, ice-boxes, flower-stands or the like, since the shape which can be obtained has to be developable from a plane plate;

expansion of the pre-formed articles is interrupted, said articles being constrained within a rigid frame during their transfer, whereby resulting in the production of objects which show relative poor elasticity and which are rigid and breakable;

the transfer apparatus is quite sophisticated, since the parallel platens, within which are slidingly received the frames holding the preformed plates, has to be carefully machined and fitted.

OBJECTS OF THE INVENTION

It is therefore an object of the present invention to provide a molding method which overcomes the aforesaid drawbacks of the known methods.

SUMMARY OF THE INVENTION

In order to meet these objects, and other, the method of the invention includes the following steps:

injecting in a first mold, which has been previously heated and which is maintained at a first substantially constant temperature, a pre-determined amount of a thermoplastic material in the form of pre-expanded beads containing a porogeneous fluid, said first mold having at least approximatively the shape and the final dimensions of the article to be obtained for obtaining a rough pre-molded article;

supplying to said beads within said first mold a thermal energy in an amount necessary to bring said beads to a plastic state while causing a partial melting of their outer walls, and to cause said beads to partially expand as a result of the vaporization of said porogeneous fluid therein while the inner pressure within said beads increases, and to finally cause said beads to agglomerate together;

withdrawing in a single phase or in successive phases the pre-formed article from said heated first mold, said preformed article being at least approximatively at the temperature of said first mold;

allowing said article withdrawn from said heated first mold to further expand in the surrounding ambient atmosphere, said expansion being carried out in a single phase or in successive phases when withdrawing said article from said first mold;

forcing the further expanded pre-formed article within a second mold maintained at a second constant temperature lower than said first temperature of said first mold, said second mold having the exact shape and dimensions of the article to be obtained; and extracting from said second mold the article having at least its outer portions at a temperature lowered to said second temperature of said second mold.

The method of the invention offers many advantages:

(1) A gain in consummated energy of about 90% in comparison with the known methods, owing essentially to the fact that said first mold is maintained at a substantially constant elevated temperature, whereby avoiding alternative heating and cooling of a mold as in most of the known machines. For example, in known machines, the mold, the injection head, the cooling coils, the ejectors, and the piping, which are alternatively heated and cooled represent an average weight of metal of about 150 kg which, in comparison with the 0,150 kg of thermoplastic material of a medium size article, result in a mass ratio:

$$\frac{\text{Weight of expandable material}}{\text{Weight of fabrication apparatus}} = \frac{1}{1000}$$

By maintaining the temperature of the production apparatus constant, it is achieved a considerable reduction of energy consumption.

(2) Low steam injection. The steam injected, as a heating medium, only serves to provide the thermal energy necessary to cause the beads within the heated mold to partially expand, whereby resulting in a very low consumption in steam.

(3) Final dry articles. In the known machines, the articles are submitted to the heating cycle and to the cooling cycle in the same mold with a presence of steam and of cooling water whereby resulting in condensation of said steam. When withdrawn from said machine, the articles are wet, and it is accordingly necessary to submit same to a drying step in a drying station. With the method of the invention, the molded finished articles show a very low residual humidity, whereby permitting to suppress the drying station and to find new openings for the articles, such as direct packing without specific measures of products to be kept dry, for instance pharmaceutical products, opto-electronical apparatus, precision instruments or the like.

Since the heated mold is at a temperature always higher than the temperature of the steam injected for heating the thermoplastic material in said mold, said steam does not condensate as it usually occurs in the cooled mold of the known methods.

In order to compare the water content of the finished article, tests have been carried out with identical articles obtained by a conventional method and by the method of the invention. A same pre-expanded thermoplastic material has been accurately weighed short before carrying out both methods. In the same way, the finished articles have been directly weighed after being extracted from the molding apparatus. The articles manufactured by carrying out the conventional method have been dried on their outer surfaces.

Comparison result

|  | Conventional method | Method of the invention |
|---|---|---|
| Weight before molding | 1.000 g | 1.000 g |
| Number of articles | 240 | 240 |
| Weight after molding | 1.350 g | 1.013 g |
| Water content | 350 g | 13 g |
| Water content in percentage | 25,93% | 1,28% |

As previously mentioned, the additional drying step in drying stations is absolutely unnecessary in the method of the invention. The average energy consumption for drying the articles is about 1850 kg/h for a fabrication plant transforming 120 Tons of rough thermoplastic material per month.

(4) Elasticity of the finished articles. Expansion within the heated mold of the invention is only partial. Expansion is substantially completed when the pre-molded article is withdrawn from said mold. The porogeneous fluid initially contained within the beads of thermoplastic material vaporizes due to the heating caused by the injected steam during the pre-molding step of the article in the heated mold. The quasi-total expansion of the pre-molded article results in an adiabatic pressure drop within the beads, whereby resulting in turn in a cooling of the vaporizated gas which anew liquefies. During a short while, before the air enters the expanded beads through their relatively porous walls, there is a negative pressure within said beads which remain conveniently malleable at the temperature at which the article is withdrawn from the first mold. Use is made of said privileged state to transfer the pre-molded article towards the cold mold and to slightly compress same within said cold mold. Contact between the article and the cold mold instantaneously stabilizes the temperature of the outer surfaces of the molded article when the inner mass of the article will get cold ulteriorly after the molded articles have been withdrawn from the mold without inducing any deformations of said shaped outer walls.

Said phase of pressure drop or total expansion permits to greatly reduce the time the thermoplastic material remains in the hot mold and to obtain articles having improved elasticity and shock-absorbing properties, and contributes to reduce the residual humidity of the finished molded articles, steam being eliminated during the transfer in ambient atmosphere.

(5) Suppression of additional equipments. The steam generating boiler can be designed for a low steam capacity. The cooling apparatus which is necessary in conventional methods is suppressed as also the drying apparatus, since finished articles are obtained with residual humidity ratios lower than those measured on articles leaving the drying station in conventional plants.

(6) Increased production rate. The whole duration of a complete cycle is 5 to 10 times shorter than with conventional machines.

In order to establish comparative tests, articles having a diameter of 80 mm and a height of 40 mm has been produced with a conventional molding machine and with a machine carrying out the method of the invention. With the method of the invention, said articles are manufactured in 6 seconds, i.e. a production per hour of about 600 articles. The molds which have been used have 120×120 mm in dimensions. The machine does not include any mechanical ejector and comprises a single injecting device. Adjustment time is reduced to half an hour. With a conventional method, the duration of a cycle is about 2, 5 to 3 minutes. To obtain a production rate of 600 articles per hour, it would be necessary to make use of a molding apparatus with 25 molding cavities, 25 injecting devices and 25 ejectors. The molding apparatus is 600×600 mm in dimensions and the adjustment time required is about a day.

Comparative compression and bending tests have been established with articles obtained with the conventional method and with the method of the invention. Said tests are herein above listed in tables I and II with reference to drawings 1, 2, 3 and 4 as it will be explained later.

BRIEF DESCRIPTION OF THE DRAWINGS

Other advantages of the present invention will become apparent from the following detailed description of preferred embodiments for carrying out the method of the invention, by reference to the appended drawings, on which.

DETAILED DESCRIPTION OF THE DRAWINGS

Figure 1:
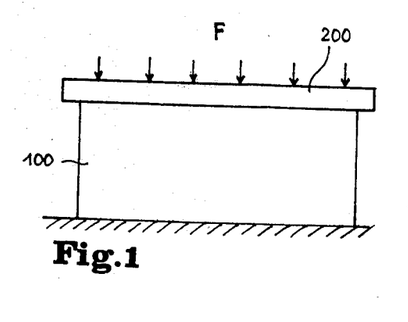
FIG. 1 is a schematic view of a test apparatus for carrying out comparative compression tests on molded articles obtained by a conventional method or by the method of the invention.

Referring to FIG. 1, a test specimen 100 is a block of expanded polystyrene having a density of 22 g/l obtained from a rough material known as Monsanto 435 polystyrene. Dimensions of the specimen are 70×25 mm. The compressed or loaded surface, generally referenced by the numeral 200, has an area of 49 cm$^2$. Tests have been made with seven specimens and compression measurements have been made every minute for taking into account creeping of the loaded material. Results of the compression tests are listed in appended table I, where Ta corresponds to the average crushing with a test specimen obtained by the method of the invention and Ca corresponds to the average crushing with a test specimen obtained by a conventional method.

TABLE I

| Load | Stress | Crushing in mm. | |
|---|---|---|---|
| Kgf | Kgf/cm$^2$ | Ta | Ca |
| 10 | 0.20 | 0.06 | 0.13 |
| 20 | 0.41 | 0.40 | 0.25 |
| 30 | 0.61 | 0.71 | 0.37 |
| 40 | 0.82 | 1.08 | 0.53 |
| 50 | 1.02 | 1.46 | 0.73 |
| 60 | 1.22 | 1.80 | 2.02 |
| 70 | 1.43 | 2.30 | 3.94 |
| 78 | 1.59 | 2.77 | 6.25 |
| 87 | 1.78 | 4.77 | 9 |
| 97 | 1.98 | 5.95 | 11.25 |
| 107 | 2.18 | 8.25 | 13 |
| 117 | 2.38 | 10 | 14.5 |
| 127 | 2.59 | 11.50 | 16 |

Figure 2:
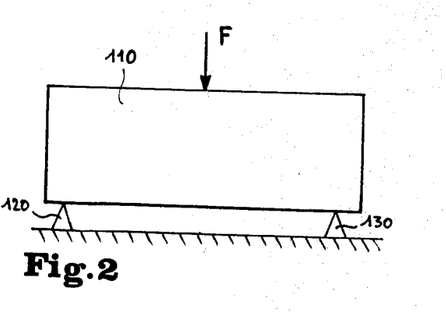
FIG. 2 is a diagram showing the results of said compression tests.

The corresponding diagram on FIG. 2 shows that creeping occurs sooner in specimens obtained by the conventional method.

Figure 3:
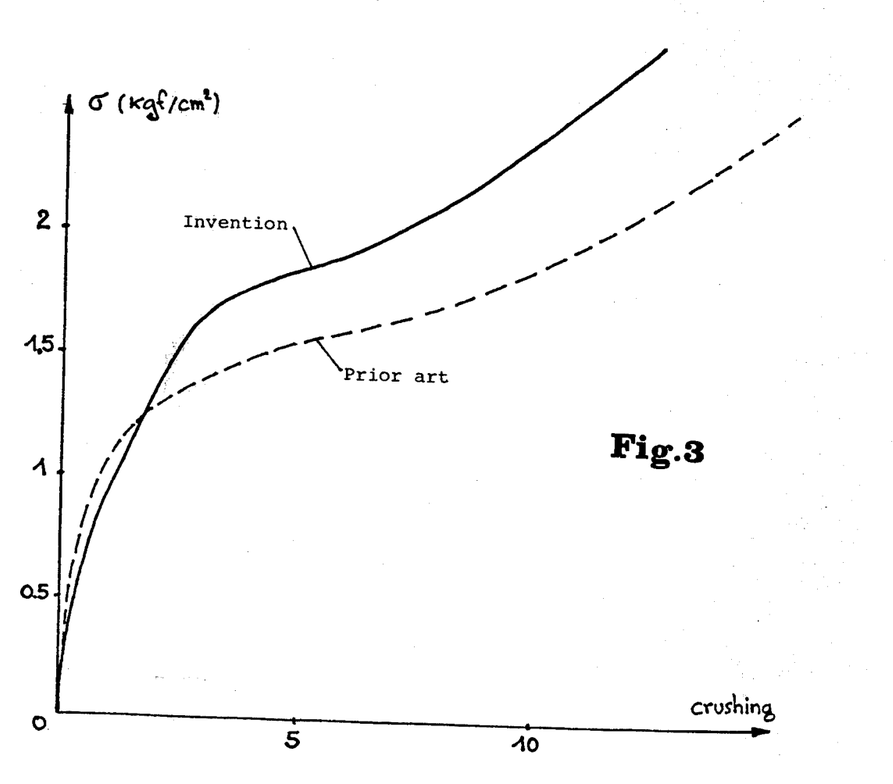
FIG. 3 is a schematic view of an apparatus for carrying out comparative bending tests on molded articles obtained by a conventional method and by the method of the invention.

Referring now to FIG. 3, the test specimen, generally designated by the numeral 110, is 200×50×25 mm in dimensions and is made of an expanded polystyrene having a density of 22 g/L (rough material: Monsanto 435 polystyrene). The distance between supports 120 and 130 is 180 mm. The force F on the specimen is exerted in a median plane equidistant from the supports 120 and 130. The results are listed in table II where Ta corresponds to the sag for a specimen obtained by the method of the invention, Ca corresponding to the sag for a specimen obtained by conventional methods.

TABLE II

| Load | Sag in mm | |
|---|---|---|
| F in kg | Ta | Ca |
| 0.315 | 0.67 | 0.70 |
| 1.22 | 2.93 | 2.75 |

TABLE II-continued

| Load | Sag in mm | |
|---|---|---|
| F in kg | Ta | Ca |
| 2.12 | 6.80 | 6.80 |
| 2.28 | 7.60 | 8.15 |
| 2.44 | 8.37 | 9.80 |
| 2.60 | 10.17 | 10.58 |
| 2.75 | 10.80 | 11.90 |
| 2.86 | 11.40 | 13.75 |
| 2.97 | 12.40 | 15.40 |
| 3.08 | 13.53 | 16.40 |
| 3.19 | 15.20 | 18.50 |
| 3.30 | 16.70 | 22 |
| 3.41 | 18.55 | — |
| 3.52 | — | — |
| 3.63 | — | — |

Figure 4:
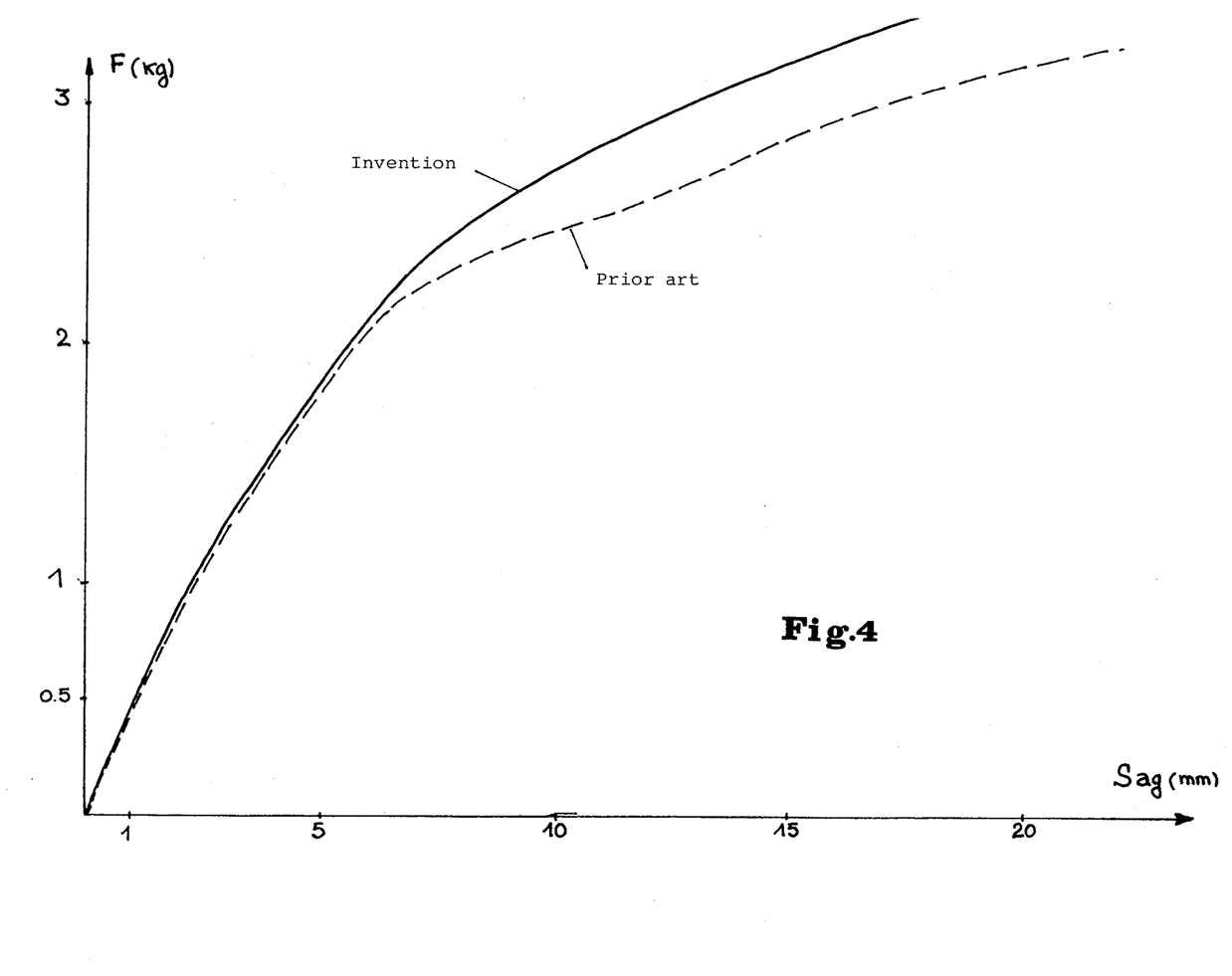
FIG. 4 is a diagram showing the results of said tests.

The diagram in FIG. 4 illustrates the results listed in table 2.

Figure 5:
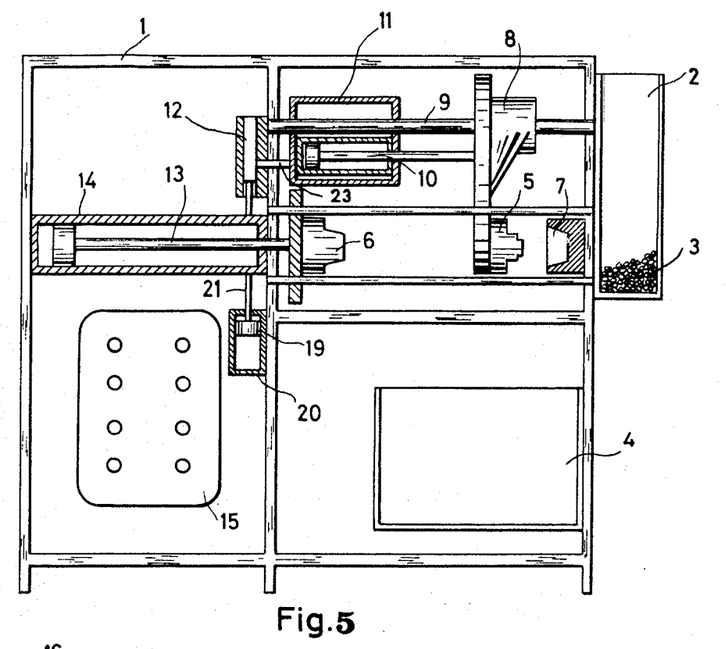
FIG. 5 is a schematic view of an embodiment of the apparatus for carrying out the method of the invention.

Referring now to FIG. 5, the apparatus of the invention for manufacturing expanded thermoplastic material articles includes a frame 1, made from tubes or steel sections supporting a container 2 to store the raw material in the form of expanded polystyrene beads 3, a container 4 for collecting the articles produced, and various units for the transformation of the raw material and for the control of the apparatus.

These various units comprise essentially the male portion 5 and the female portion (not shown) of a heated mold, the male portion 6 and female portion 7 of the cold mold (described in detail with reference to FIGS. 8 and 9) and one member 8 to transfer the article from the heated mold into the cold mold. The male portion 5 of the heated mold is mounted at the lower end of the member 8 which is positioned so that it can slide on a shaft 9 under the action of a piston 10 received in a housing 11 of prismatic configuration. In addition, the member 8 can pivot in its plan like a pendulum about said shaft 9 between a first position into which the male portion 5 of the heated mold is placed in front of its corresponding female portion and a second position wherein the portion 5 is in front of the portion 7 of the cold mold to effect the transfer of the article and introduce it in mold portion 7. This swinging motion is obtained through a mechanism 12 which is shown in more details in FIGS. 6 and 7.

The male portion 6 of the cold mold is mounted on the free end of a piston rod 13 which is slidably received into a cylinder 14 to reciprocate horizontally. Also supported by the frame 1 is a control panel 15 for the control of various elements of the apparatus.

The transfer mechanism will be now described with reference to FIGS. 2 and 3. The mechanism 12 substantially comprises two slides 16, 17 and a plate 18 which can slide vertically in slides 16 and 17 under the action of a piston 19 slidably received into a cylinder 20 and connected to the plate 18 by a rod 21. A curvilinear opening 22 is formed in the plate 18 into which is engaged the end of a pin 23 connected to the housing 11. Once the piston 19 is moved downwards (as shown on FIG. 7) by a fluid under pressure fed to the cylinder 20, the end of a pin 23 is guided in the curvilinear opening acting as a cam and driving the housing 11 together with the pin to a position 11' shown by dotted lines. The housing 11 is rigidly fixed to the member 8; the pendulum or swinging motion of the latter is derived from the mechanism 12. The position 11' (as shown in FIG. 7) of the housing 11 corresponds to the new position 18' of the plate 18 and 23' of the pin end 23.

Figure 8:
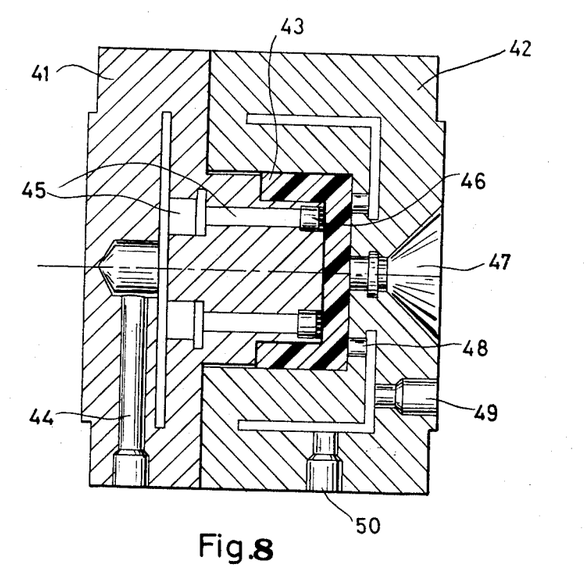
FIG. 8 is a sectional view of an embodiment of the heated mold shown in its closed position.

FIG. 8 shows schematically an embodiment of the heated mold which comprises a male portion 41 and a female portion 42 in which is formed a molding cavity 43 to be filled with thermoplastic material. An inlet passage 44 for steam in the male portion 41 is connected to internal passages 45 which themselves terminate in nozzles 46. The purpose of these nozzles is to inject steam into the molding cavity 43 to expand the thermoplastic beads therein. The female portion 42 is also provided with a tapered injection inlet passage 47 for the thermoplastic material with steam exhaust nozzles 48 for the excess steam which are in communication with the outlet steam ports 49, and with a condensed water exhaust port 50.

Figure 9:
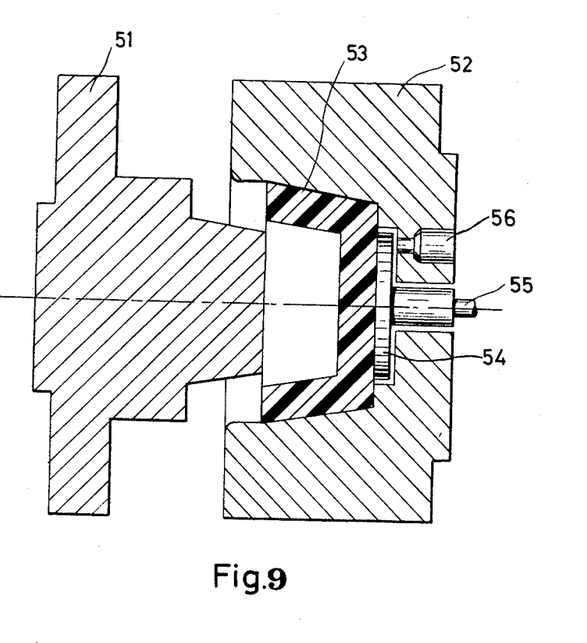
FIG. 9 is a sectional view of an embodiment of the cold mold shown in its open position.

FIG. 9 shows schematically an embodiment of a cold mold including a male portion 51 and a female portion 52 of this mold. Both members are so constructed that the molding cavity has exactly the configuration and size of the article 53 to be produced. The mold portion 52 is equipped with pushing means adapted to eject the finished article out of the cold mold. This means comprises a plate 54 which can be mechanically moved by a rod 55 or pneumatically pushed by a device connected to the port 56.

In operation of the device described above, the male portion 51 of the heated mold is urged against the female portion 52 of said heated mold by means of a piston 10, thus providing a molding cavity having approximately the configuration of the article to be produced. This mold is heated by well-known means not represented. Once the heated mold is ready for the injection process the pre-expanded polystyrene beads 3 contained in the storing container are introduced into the molding cavity through an injector. The expansion and agglomeration of the thermoplastic material beads are obtained by means of steam injected into the heated mold through the injection nozzles 46. As soon as the expansion of the material is completed, the male portion 5, of the heated mold integral with the member 8 is moved to the left (as shown on FIG. 5) by means of the piston 10; the article injected into the molding cavity remains on this male portion of the heated mold and can freely further expand thus providing pressure release.

Figure 6:
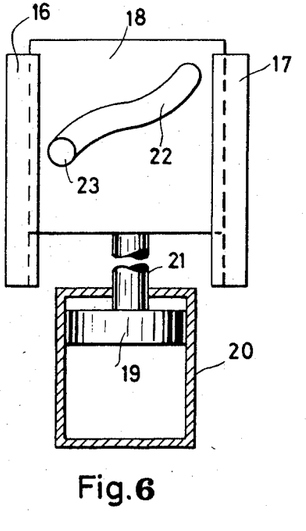
FIGS. 6 and 7 show details of the transfer mechanism of the apparatus of FIG. 5.
Figure 7:
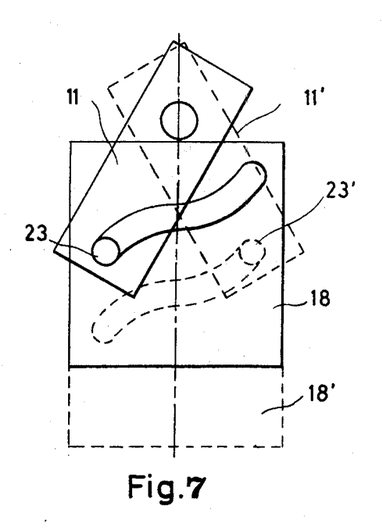

Thereafter, the piston 19 is moved downwards (as seen in FIG. 7) inside the cylinder 20 moving together with the plate 18 thus moving the end of pin 23 from its initial position shown in FIG. 6 to its final position 23 shown by dotted lines in FIG. 7. The motion of pin 23 pivotably moves simultaneously the housing 11 and the member 8 about shaft 9. In the final position of the member 8, the male portion 5, 51 of the heated mold is aligned with the female portion 7, 52 of the cold mold into which the now completely relaxed molded article will be partially engaged. At that time the piston 19 is moved again upwards causing simultaneously the housing 11 and the element 8 to swing back to their initial positions. For completely inserting the pre-formed article into the cold mold, a fluid under pressure is injected into the cylinder 14 in order to move the piston 13 to the right (as seen of FIG. 5). The male portion 6, 51 which is rigidly fixed to the free end of the piston rod 13 will forcibly engage the preformed article 53 into the molding cavity of the cold mold which has exactly the configuration and size of the article which is sought to be obtained. Thereafter the piston 13 will move to the left (as seen on FIG. 5) and the article 53 formed exactly to the size and configuration of the cold mold will be ejected by means of a mechanical action on said push rod 55 or by the pneumatic means to finally be collected in the collecting container 4.

Figure 10:
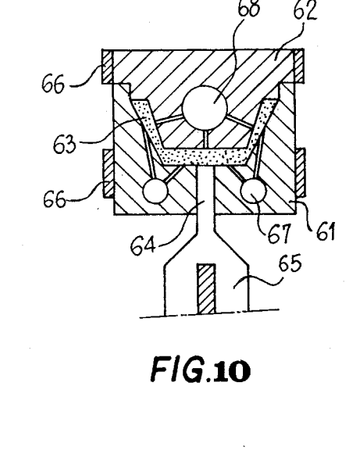
FIG. 10 is a sectional view of a second embodiment of the heated mold of the invention, shown in closed position, during pre-molding operation.

Another embodiment of the apparatus of the present invention will now be described with reference to FIGS. 10, 11 and 12. Specifically, in FIG. 10 is shown the first step of the process for the pre-molding injection step in the heated mold. The reference numeral 61 shows the female part of the heated mold for pre-forming the article, reference 62 shows the male portion of the mold. Reference 63 shows the molding cavity, reference 64 shows the injection device through which the pre-expanded material beads are forced into the molding cavity, reference 65 shows the injector body, reference 66 shows heating bands and references 67 and 68 are inlet and exhaust passages for steam.

Figure 11:
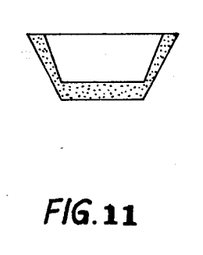
FIG. 11 is a sectional view of the molded article during its transfer from the heated mold to the cold mold.

FIG. 11 is a section view of the molded article at the time of its transfer from the first heated mold to the second and final cold mold.

Figure 12:
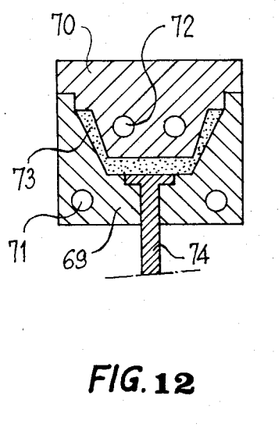
FIG. 12 is a sectional view of the second embodiment of the cold mold of the invention shown in closed position during the final molding operation.

FIG. 12 shows the second and final molding step in the cold mold. In this figure references 69 shows the female portion of the cold mold, reference 70 shows the male portion of same, references 71 and 72 show passages for circulation of cooling water, reference 73 shows the molding cavity and reference 74 shows the ejector for the finished article.

The method of invention is carried out as follows:

(1) Filling of the hot pre-forming mold. Filling of the molding cavity of the hot pre-forming mold constitutes the longer phase in the whole molding cycle. Care is only to be taken as concerns the material injecting devices which, for preventing an excessive heating thereof and an early wear of the seals, have to be removable so as to be associated to the mold only during the phase of injection of the rough thermoplastic material and to be released during the other steps of the cycle. Filling time is about 2 to 10 seconds depending on the dimensions of the articles to be manufactured.

(2) Steam injection. Means are provided, such as heating plates or electrical resistors, for heating the walls of the first mold at a temperature slightly higher than the steam temperature so as to prevent condensation thereof on the walls. Steam substantially serves only to bring the thermal energy to the thermoplastic material necessary to cause same to expand and agglomerate. Steam injection duration is between 0.5 and 5 seconds, with a steam pressure ranging between 0.5 to 2 bar.

(3) Partial expansion within the hot mold. The article is maintained within the hot mold for a time sufficient to allow the thermoplastic material to correctly expand, i.e. between 2 to 10 seconds depending upon the shape and the dimensions of the articles to be manufactured. Adjustment of the time the thermoplastic material is maintained in the hot mold permits to obtain different surface qualities for the articles. For instance, increase of said time results in an over-heating of the outer surfaces of the article and in a superficial fusing of thermoplastic material which is required for specific purposes.

(4) Extraction of the pre-molded articles and expansion. Free expansion is the step of the method which permits great reduction in the duration of the whole production cycle (6 minutes for cylindrical pieces having 80 mm in diameter and 40 mm in height).

Depending upon the shape of the mold, withdrawal and expansion of the pre-molded articles can be carried out in several successive steps. For instance, for recessed shapes, the mold comprises a central core which is first withdrawn, thereby allowing the inner hollow portion of the article to first expand. The article is then withdrawn from the mold, thereby allowing the outer portions of the article to further expand. Such an operating mode prevents deformations which in certain cases are due to rapid withdrawal of the rough preformed article.

(5) Transfer of the pre-molded article. The transfer consists in withdrawing the pre-molded article from the hot first mold, in transporting same in a position facing the cold second mold and in introducing same in said second mold by mechanical means. The transfer duration is relatively short, about a few seconds. Said duration depends upon the time required to leave the pre-molded article to further expand in the surrounding air at the ambient atmospheric pressure, the pre-molded article being eventually submitted at the same time to a thermal radiation.

Transfer motion has to be carried out without shocks and without inducing stresses in the pre-molded article. The way said pre-molded articles are introduced within the cold mold depends upon the configuration of said mold. The expanded pre-molded article may have dimensions slightly greater than the dimensions of the final article to be obtained. The cold mold is designed so as the premolded article may be eventually forced within the mold without removing. More generally, the molds are designed so as to allow a free introduction of the pre-molded articles therein, compression of said articles being initiated only after the article has been introduced within the mold through relative motion between parts of the mold.

(6) Ejection. The finished article may be ejected from the cold mold either mechanically or pneumatically. Owing to the higher production ratios, mechanical ejection can be suppressed since use is generally made of molds formed with a single molding cavity.

While the present invention has been described with reference to two preferred embodiments, many alternatives changes and modifications will appear to those skilled in the art such as particularly:

as the transfer time of the pre-formed article from the heated mold to the cold mold is not critical per se, it is possible to design a machine having two stations, one station for hot molding positioned at some distance for a second station for cold molding, both stations being connected by transfer means, for example a conveyor belt.

the pre-formed articles can be molded under vacuum into the cold mold. This technique enables to considerably increase the relative pressure inside the expanded thermoplastic material beads thereby permitting easier production of low density articles.

both molds can be on the same molding press or on separate presses, one first pre-forming heated mold can be provided for several second cooled molds or vice-versa the transfer device between molds can be mechanical, pneumatic, or of another type heat transfer from the heating mold to the thermoplastic material can be made by any known means such as electrical resistors, steam, heated oil and the like.

Further to the multiple advantages already mentioned, the method of the invention can provide articles having a higher density which are more resilient than similar articles molded with the standard method. These articles are more flexible and less brittle, thereby showing an improved ability for acting as shock or impact absorbing pads, especially when they are used for packaging.

It is not intended that the invention be limited solely to those disclosed embodiments. Instead, many modifications will occur to those skilled in the art which lie within the spirit and scope of the invention.

What is claimed is:

1. A method for forming shaped articles from preexpanded thermoplastic beads, in two cycles, comprising a first cycle which includes the stages of
    introducing said beads into a first mold cavity of a first mold to fill said mold cavity,
        wherein said first mold cavity is defined by only a male member and a female member, and
        wherein said first mold is maintained at a substantially constant elevated temperature throughout said two cycles;
    injecting steam into said first mold to cause the beads to expand, partially melt, agglomerate and to form a shaped cellular preform;
    disengaging said two members of the first mold; and
a second cycle which includes the stages of
    transferring said shaped cellular preform, at substantially ambient pressure, from both members of the first mold to a second mold,
        the shaped preform being free to expand under the conditions of said transferring,
        wherein said second mold is at a second substantially constant temperature throughout said two cycles,
        wherein said second substantially constant temperature is lower than said substantially constant elevated temperature, and
        wherein the cavity of said second mold has the shape of the ultimate shaped article;
    cooling and compressing said shaped cellular preform in said second mold; and
    removing the finished article from said second mold.

2. The method of claim 1, wherein, after the stage of transferring, said second mold is closed; said first mold members are engaged and then said first mold cavity is refilled with preexpanded thermoplastic beads.

3. The method of claim 2, where, after said first mold is refilled, said stages of injecting, disengaging, transferring, cooling and compressing, and removing are repeated.

4. The method of claim 3, wherein said beads are of polystyrene.

5. The method of claim 1,
    wherein said preform is retained by one mold member of said first mold during disengagement of said members of the first mold; and
    wherein transferring is effected by conveying said preform on said first mold member which retains said preform to said second mold.

6. The method of claim 5, wherein said second mold is formed of a female member and a male member; wherein the female members of said first mold and said second mold are substantially identical in configuration and wherein the male members of said first mold and said second mold are substantially identical in configuration; and wherein said step of transferring is undertaken by moving said member of the first mold which retains said shaped cellular preform to the mating member of said second mold and disposing the shaped cellular preform on said mating member of the second mold.

7. The method of claim 6, wherein, after the stage of transferring said second mold is closed; said first mold members are engaged and then said first mold cavity is refilled with preexpanded thermoplastic beads.

8. The method of claim 7, wherein, after said first mold is refilled, said stages of injecting, disengaging, transferring and cooling and compressing and removing are repeated.

9. A method of forming shaped articles from preexpanded polystyrene beads in two cycles, comprising
a first cycle which includes the stages of
    filling a base mold cavity of a first mold with preexpanded polystyrene beads,
        wherein said first mold is maintained at a substantially constant elevated temperature throughout said two cycles and
        wherein said first mold is formed of two members, one being a female member and the second member being a male member;
    injecting steam into said first mold to cause the beads to expand, to partially melt and to agglomerate to form a shaped cellular mass within the mold;
    disengaging the mold members of said first mold, to open the mold, in successive stages, wherein during said disengaging the shaped cellular mass is retained by one of said two mold members of said first mold; and
a second cycle which includes the stages of
    transferring said shaped cellular mass at substantially ambient pressure from said first mold member which retains the shaped cellular mass to a second mold substantially identical in configuration to said first mold said second mold being defined by two mold members other than the first said two members
        said shaped cellular mass being free to expand under the conditions of the transferring stage,
        wherein said second mold is at a second substantially constant temperature throughout said two cycles, and
        wherein the second substantially constant temperature is lower than said substantially constant elevated temperature;
    cooling and compressing said shaped cellular mass in said second mold; and
    removing said article from the second mold.

10. The method of claim 9, wherein said second mold is formed of a male member and a female member, wherein the one of said members of the second mold is adapted to couple and mate with a mating member of the first mold;
    wherein the stage of transferring is undertaken by moving said member of the first mold which retains said shaped cellular mass into a position to couple with its mating member of said second mold, by conveying the shaped cellular mass to the mating member of said second mold, and then by returning that member of the first mold to its prior position, and
    wherein said stage of cooling and compressing is undertaken by engaging the two mold members of said second mold.

11. The method of claim 10, wherein, after said transferring, the second mold and the first mold are closed and then the first mold is refilled with said preexpanded polystyrene beads.

12. The method of claim 11, wherein, after refilling, said steps of injecting, opening and disposing are repeated.

* * * * *